Patented Jan. 15, 1924.

1,480,928

UNITED STATES PATENT OFFICE.

HOWARD B. BISHOP, OF SUMMIT, NEW JERSEY.

ALUMINUM COMPOUND.

No Drawing.   Application filed March 7, 1921.   Serial No. 450,409.

*To all whom it may concern:*

Be it known that I, HOWARD B. BISHOP, citizen of the United States, and resident of Summit, in the county of Union and State of New Jersey, have invented certain new and useful Improvements Relating to Aluminum Compounds, of which the following is a specification.

My invention relates to improvements relating to aluminum compounds; more particularly to processes of treating aluminum bearing minerals or salts and also the obtaining of a new composition containing aluminum salt of salts.

Certain aluminum salts and clay are used extensively in paper coating or sizing and one object of the invention is to obtain such aluminum salt in a more efficient manner and also in combination with other ingredients which are of great benefit in connection with the paper coating or sizing.

If ordinary white clay which, of course, is insoluble in water, be treated with sulphuric acid it is found that it is not substantially decomposed by the acid so that treatment with sulphuric acid does not serve as a practical means for decomposing the clay to form an aluminum salt as desired. I have discovered, however, that if the clay be treated with the sulphuric acid in the presence of a suitable fluorine compound, that a fluorine acid may be formed which will cause the clay to be decomposed with the final result that an aluminum salt of the acid is produced as well as possibly some aluminum fluoride. The resultant product will also contain a substantial amount of silicious material resulting from the decomposition of the clay which silicious material may be in the form of colloidal silica or gelatinous silicic acid.

In carrying out the invention in one form I preferably take 18 parts of 93% sulphuric acid and dilute with 15 parts of water. To this I add some white clay and then add calcium fluoride or fluorspar, but not so much as to cause hydrofluoric acid to be evaporated from the reaction. During the process the batch should be heated all the time as by steam coils to about the boiling point of the mixture and should also be kept thoroughly agitated. After some calcium fluoride has been added as above specified, I then add more clay and the remaining calcium fluoride, the proportion of calcium fluoride still being insufficient to cause hydrofluoric acid to be evaporated. Finally an excess of the clay is added to render the solution neutral or basic. I preferably continue the addition of calcium fluoride and clay until five parts of the calcium fluoride have been added and 25 parts by weight of the clay have been added to the original 18 parts of 93% acid and 15 parts of water.

The reactions which take place I believe are substantially as follows. The clay is not materially attacked directly by the sulphuric acid but the calcium fluoride (or fluorspar) is decomposed by the sulphuric acid forming hydrofluoric acid and calcium sulphate. It is thought that the hydrofluoric acid acts on the silica present in the clay forming some hydrofluosilicic acid. The clay is decomposed by the hydrofluoric or hydrofluosilicic acid or both forming aluminum fluoride and finely divided silica or scilicic acid. The aluminum fluoride is at once decomposed by the sulphuric acid forming aluminum sulphate and thereby liberating more hydrofluoric acid which serves to decompose more clay and so the reaction proceeds until one or another of the three original ingredients is used up. If sulphuric acid is present in excess, the resultant batch will be acid and most of the clay should be decomposed. If, however, the clay is added in excess, the resultant batch should be neutral or basic and some clay will remain undecomposed but all of the acid will be decomposed.

By the above process it will be seen that I have discovered an extremly simple and efficient manner for decomposing clay which is substantially undecomposable by sulphuric acid, by treating it in the presence of a fluorine compound with sulphuric acid thereby forming a fluorine acid which is capable of decomposing the clay, and the treatment is carried out in water solution without driving off any material amount of acid.

The resultant batch I believe contains mainly aluminum sulphate in solution, more or less aluminum fluoride insolution, clay, gelatinous silicic acid or finely divided colloidal silica or both, and calcium sulphate not in solution and possibly some calcium fluoride not in solution. The excess clay also will remain not in solution.

The above composition I find to be excellent in paper coating and sizing. The aluminum sulphate and aluminum fluoride serve for decomposing the sodium resinate commonly used in size. The clay, the calcium sulphate and calcium fluoride act as fillers and the silicic acid or gelatinous silica acts as a binder and hardener. The composition has the advantages in that before being put into the paper pulp, the silicious material which is I believe, in a colloidal and gelatinous state, serves to hold up the clay, calcium sulphate and calcium fluoride or other fillers and prevent them from settling out. The silicious material also prevents these materials from settling out in the paper pulp beater after the composition has been added thereto. Clay has been commonly used as a filler for paper size and the like but in the past it has been found that a great deal of it has been lost in the process because of its settling out and not passing on to the paper machine with the paper pulp. With my improvements, however, the silicious material tends to hold up the fillers and prevent them from settling out before the pulp goes on to the machines. The composition resulting from my process also has the advantage that the aluminum salts are already in solution so that in order to produce a paper sizing material therefrom, one does not have to dissolve them as they do with the sulphate of aluminum which has been commonly used for this purpose. The presence of the aluminum fluoride (and possibly some hydrofluoric acid) is advantageous in the composition because it will react with any soluble lime or magnesium salts in the beater to form insoluble fluorides which also serve as hardeners and fillers.

White clay, $Al_2O_3 \cdot (SiO_2)$, is practically insoluble in sulphuric acid. Other clay material such as bauxite is substantially soluble in sulphuric acid and therefore has been used to a great extent for making the aluminum sizing material. But such bauxite contains iron which had to be reduced to the ferrous state and even then it has been found very objectionable for the better grades of paper. According to my invention the white clay, practically insoluble in sulphuric acid may be used, which clay contains substantially no iron so that after the decomposing of the clay as above specified, no further treatment is required before the batch is added to the paper pulp. However, it will be understood that my process is also useful for the obtaining of soluble aluminum compounds such as aluminum fluoride and suphate from any kind of insoluble aluminum silicates or compounds particularly the aluminum bearing minerals. Instead of using calcium fluoride as the salt for the production of the fluorine acid, any other suitable fluorine compound may be used which is decomposed by the acid to form a fluorine acid which will attack and decompose the original aluminum compound. Thus for example sodium fluoride might be used, but calcium fluoride is preferred because of its abundance and cheapness. According to the above described process I am able to form hydrofluoric acid directly in water solution from the fluorine salt and do not have to evaporate it or condense it before using it for the decomposition of the aluminum bearing material. Instead of using sulphuric acid for decomposing the calcium fluoride, obviously any other acid may be used which will decompose the original fluoride forming a fluorine acid which will decompose the original aluminum bearing material. However, sulphuric acid is preferred as it produces a very desirable aluminum salt in the resultant batch if it is to be used as paper size material.

While the process and product which have been described are particularly advantageous for paper sizing work, it will be obvious that the process may be useful in the production of soluble aluminum salts as an intermediate for the recovery of alumina and metallic aluminum from the clay.

While I have described my improvements in great detail and with regard to preferred forms thereof, I do not desire to be limited to such details or forms since from the above, it will be obvious that many changes and modifications may be made and many equivalents substituted for the particular ingredients specified and the resulting new composition varied in various respects without departing from the spirit and scope of the invention in its broader aspects.

What I claim as new and desire to secure by Letters Patent, is:

1. The process of obtaining soluble aluminum salts from aluminum bearing mineral which consists in treating a water insoluble aluminum bearing mineral decomposable by hydrofluosilicic or hydrofluoric acid with a fluorine salt in the presence of an acid decomposing the fluorine salt to form a fluorine acid which causes decomposition of aluminum bearing mineral, the treatment being carried out not above the boiling point of the batch.

2. The process of obtaining soluble aluminum salts from aluminum bearing mineral which consists in treating a water insoluble aluminum bearing mineral decomposable by hydrofluosilicic or hydrofluoric acid, with a fluorine salt in the presence of an acid decomposing the fluorine salt to form a fluorine acid which causes decomposition of aluminum bearing mineral and the formation of an aluminum salt of the said acid the treatment being carried out in water solution without driving off any material amount of acid.

3. The process which consists in treating a water insoluble aluminum bearing mineral decomposable by hydrofluosilicic or hydrofluoric acid, with a fluorine salt and sulphuric acid decomposing the fluorine salt to form a fluorine acid which causes decomposition of the aluminum bearing mineral the treatment being carried out not above the boiling point of the batch.

4. The process which consists in treating an aluminum compound insoluble in water substantially undecomposable with sulphuric acid, with a fluorine salt in the presence of sulphuric acid decomposing the fluorine salt to form a fluorine acid which causes decomposition of the aluminum compound.

5. The process which consists in treating an aluminum bearing silicious compound insoluble in water with a fluorine salt in the presence of an acid decomposing the fluorine salt to form a fluorine acid which causes decomposition of the aluminum compound and the formation of an aluminum salt of said acids the treatment being carried out in water solution without driving off any substantial amount of acid.

6. The process which consists in heating an aluminum bearing silicious compound substantially undecomposable with sulphuric acid, with a fluorine salt in the presence of sulphuric acid decomposing the fluorine salt to form a fluorine acid which causes decomposition of the aluminum salt and the formation of an aluminum salt of said acid, the aluminum salt being added in excess to render the resulting batch non-acid.

7. The process which consists in treating a water insoluble aluminum compound with water and a fluorine salt in the presence of sulphuric acid decomposing the fluorine salt to form a fluorine acid which causes decomposition of the aluminum salt, the aluminum salt being added in excess to render the resulting batch non-acid the treatment being carried out not above the boiling point of the batch.

8. The process which consists in heating clay which is substantially undecomposable with sulphuric acid, with fluorspar and sulphuric acid, causing the formation of a fluorine acid which decomposes the clay, and the formation of aluminum sulphate and fluoride.

9. The process which consists in heating clay which is substantially undecomposable with sulphuric acid, with calcium fluoride and sulphuric acid, causing the formation of a fluorine acid which decomposes the clay, and the formation of aluminum sulphate, the clay being added in excess.

10. The new composition comprising a water solution of aluminum sulphate and fluoride containing silicious material and calcium sulphate.

11. The new composition comprising a solution of an aluminum salt containing colloidal silicious material and a salt of an alkaline earth metal.

12. The new composition comprising a solution of an aluminum salt containing gelatinous silicious material not in solution and a salt of an alkaline earth metal.

13. The new composition comprising a solution of aluminum sulphate and some aluminum fluoride, the solution also containing silicious material, calcium sulphate and some clay.

14. The new composition comprising a solution of aluminum sulphate, the solution also containing gelatinous silicious material calcium sulphate and some clay.

15. The new composition containing aluminum sulphate, silicious material, a fluoride, calcium sulphate and some clay.

16. The new composition containing an aluminum salt, silicious material, a fluoride, and a salt of an alkaline earth metal.

Signed at New York, in the county of New York, and State of New York, this 5th day of March, A. D. 1921.

HOWARD B. BISHOP.